United States Patent
Lentz

(10) Patent No.: US 7,296,854 B2
(45) Date of Patent: Nov. 20, 2007

(54) SAFETY SEAT RESTRAINT SYSTEM

(75) Inventor: David L. Lentz, Howell, MI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/489,345

(22) Filed: Jul. 19, 2006

(65) Prior Publication Data

US 2007/0108832 A1  May 17, 2007

Related U.S. Application Data

(60) Provisional application No. 60/737,482, filed on Nov. 17, 2005.

(51) Int. Cl.
*A47D 1/10* (2006.01)
(52) U.S. Cl. ..................... 297/353; 296/68.1
(58) Field of Classification Search ............... 297/253; 296/68.1
See application file for complete search history.

(56) References Cited

U.S. PATENT DOCUMENTS

| | | | |
|---|---|---|---|
| 6,082,818 A * | 7/2000 | Muller ................. 297/253 X |
| 6,234,572 B1 * | 5/2001 | Shiino et al. ............... 297/253 |
| 6,276,754 B1 | 8/2001 | Youssef-Agha et al. |
| 6,361,115 B1 | 3/2002 | Aufrere et al. |
| 6,478,376 B2 * | 11/2002 | Hayashi et al. ......... 297/253 X |
| 6,767,057 B2 * | 7/2004 | Neelis ....................... 297/253 |
| 7,131,693 B2 * | 11/2006 | Smallwood et al. ........ 297/253 |
| 2004/0080194 A1 * | 4/2004 | Medvecky et al. ......... 297/253 |
| 2004/0080195 A1 * | 4/2004 | Adams et al. .............. 297/253 |
| 2007/0114826 A1 * | 5/2007 | Austin et al. .............. 297/253 |

FOREIGN PATENT DOCUMENTS

WO  WO 03070510  8/2003

\* cited by examiner

*Primary Examiner*—Rodney B. White
(74) *Attorney, Agent, or Firm*—Mark W. Croll; Paul F. Donovan

(57) ABSTRACT

A seat restraint configured to be secured to an anchoring tube includes at least one anchoring tube engaging member, and at least one fastening member integrally formed with the at least one anchoring tube engaging member.

11 Claims, 4 Drawing Sheets

SAFETY SEAT RESTRAINT SYSTEM

RELATED APPLICATIONS

This application relates to and claims priority benefits from U.S. Provisional Patent Application No. 60/737,482 entitled "Child Seat Belt Restraint System," filed Nov. 17, 2005, which is hereby incorporated by reference in its entirety.

FIELD OF THE INVENTION

Embodiments of the present invention generally relate to a restraining system for a child safety seat that is used in an automobile, and more particularly to a restraining system that is easy to install.

BACKGROUND OF THE INVENTION

Young children are typically secured in an automobile by way of a safety seat. The safety seat is secured to a seat or bench of the automobile.

FIG. 1 illustrates a conventional child safety seat 10 secured to an automobile seat 12. The automobile seat 12 may be a bench style seat located behind the driver and front passenger seats. The safety seat 10 is secured in place over the automobile seat 12 by securing to a seat restraint (not shown in FIG. 1). A safety belt 14 cooperates with the safety seat 10 to secure a child 16 therein.

FIG. 2 illustrates a conventional seat restraint 18. Typically, the seat restraint 18 extends into the center crease 20 of the automobile seat 12 proximate a buckle housing 22. The seat restraint 18 generally is not visible to the passenger. Instead, the seat restraint 18 is located just below the horizontal seat cushion.

FIG. 3 illustrates a safety seat securing member 24 secured to the seat restraint 18. The safety seat securing member 24 may be a strap or belt that is secured to the seat restraint 18 through an eyelet.

FIG. 4 illustrates an isometric view of a conventional seat restraint 18 secured to an anchoring rod or tube 26. The anchoring tube 26 is secured underneath the seat (not shown in FIG. 4). The seat restraint 18 is secured to the anchoring tube 26 through welding 28 or separate and distinct fasteners (such as screws, bolts, or the like). As such, the manufacturing process uses a separate welding step, or additional fasteners. The welding step takes additional time and effort, as does the process of securing the seat restraint 18 to the anchoring tube 26 through the separate fasteners.

Thus, a need exists for an improved seat restraint system that is quicker and easier to secure to a bent steel rod or tube.

SUMMARY OF THE INVENTION

Certain embodiments of the present invention provide a seat restraint configured to be secured to an anchoring tube. The seat restraint may include at least one anchoring tube engaging member, and at least one fastening member integrally formed with the at least one anchoring tube engaging member. The seat restraint may secure to the anchoring tube without welding or separate fasteners.

The anchoring tube engaging member may be a sleeve defining a tube passage, wherein the sleeve is configured to be positioned around at least a portion of an outer circumferential area of the anchoring tube. Optionally, the anchoring tube engaging member may be a restraint tube configured to be positioned around at least a portion of an outer circumferential area of the anchoring tube.

The fastening member may include at least one spring tab configured to snapably engage a reciprocal opening formed in the anchoring tube. Alternatively, the fastening member may include an opening that securely retains a spring tab extending from the anchoring tube. Also, alternatively, the fastening member may include a paw member and at least one spring member.

Certain embodiments of the present invention also provide a restraining system for a safety seat that is configured to be used in an automobile. The retraining system includes an anchoring tube, and a seat restraint secured to the anchoring tube.

Figure 1:
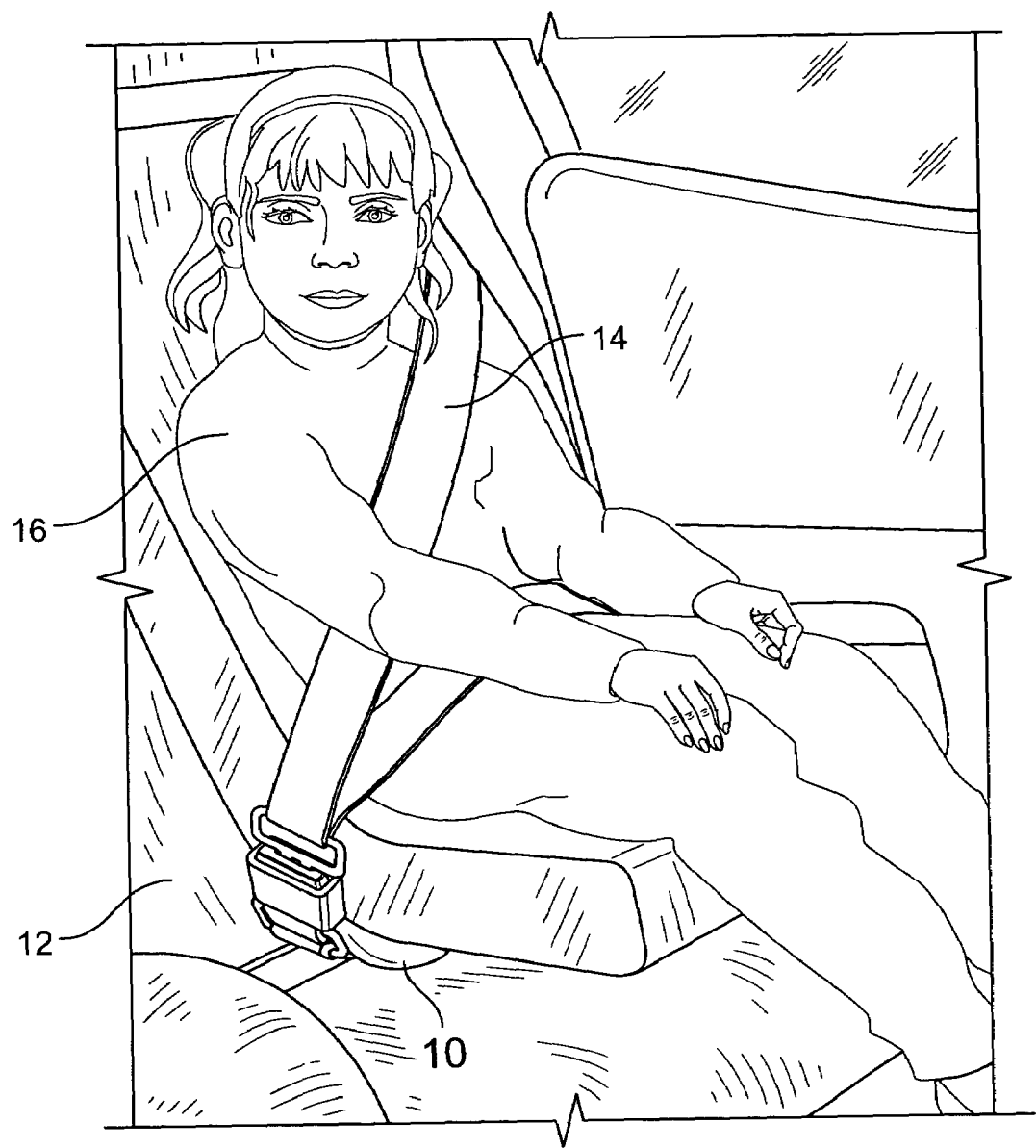
FIG. 1 illustrates a conventional child safety seat secured to an automobile seat.
Figure 2:
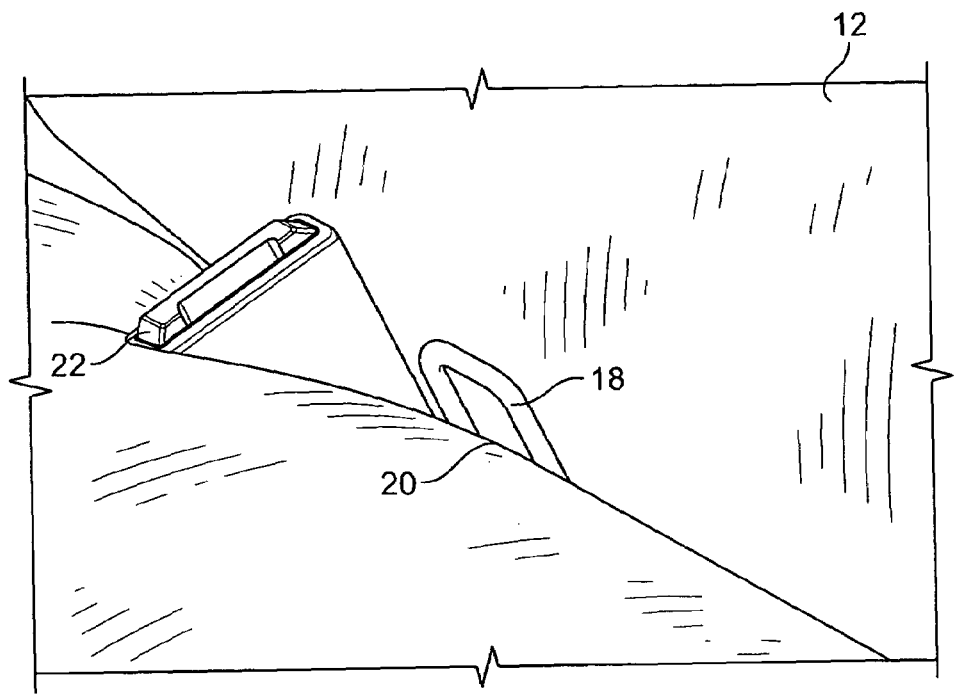
FIG. 2 illustrates a conventional seat restraint.
Figure 3:
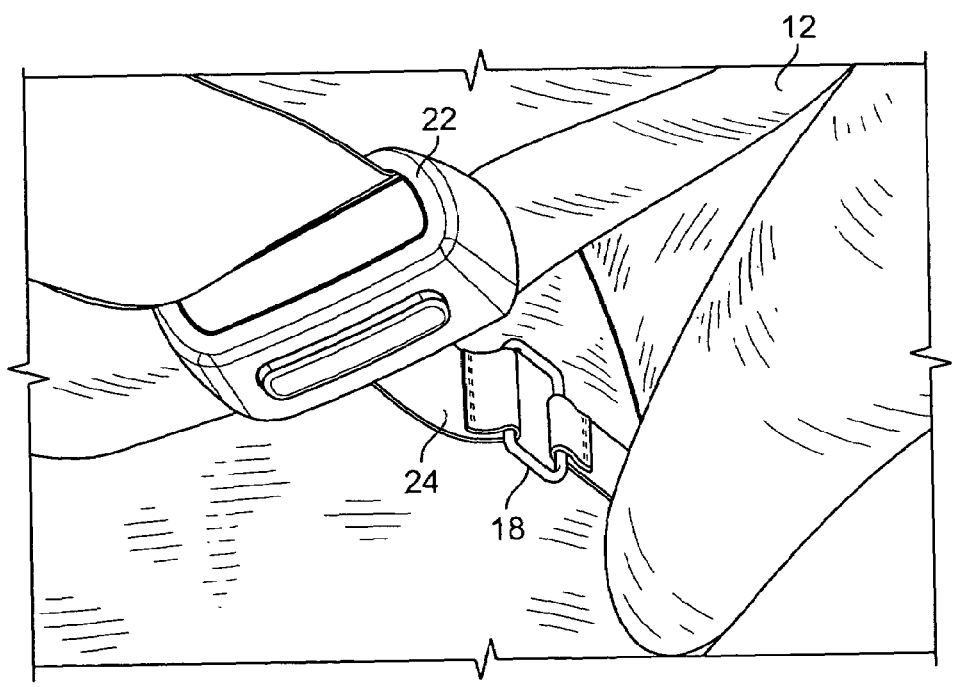
FIG. 3 illustrates a safety seat securing member secured to the seat restraint.
Figure 4:
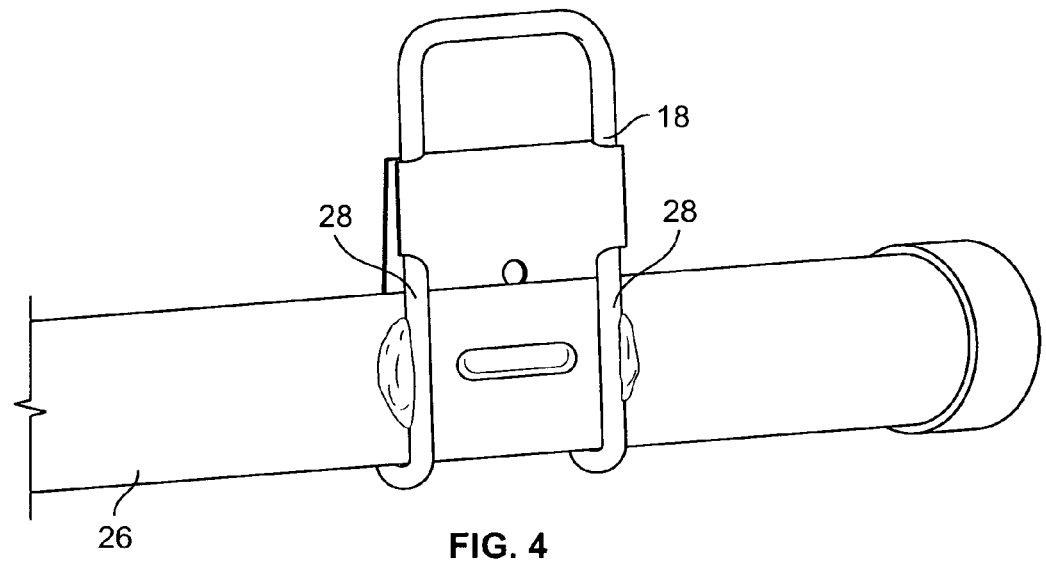
FIG. 4 illustrates an isometric view of a conventional seat restraint secured to an anchoring rod or tube.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 5:
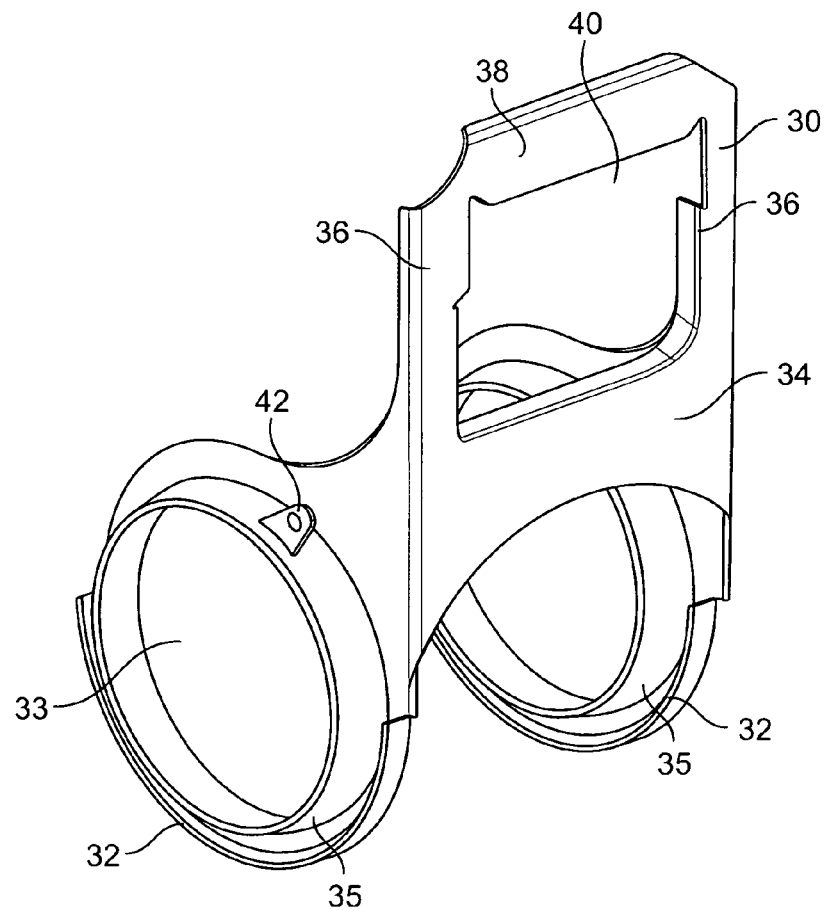
FIG. 5 illustrates an isometric view of a seat restraint according to an embodiment of the present invention.

FIG. 5 illustrates an isometric view of a seat restraint 30 according to an embodiment of the present invention. The seat restraint 30 may be a unitary structure constructed from a single sheet of metal.

The seat restraint 30 includes two sleeves 32 separated by a connecting beam 34, which is integrally connected to upstanding legs 36. The sleeves 32 may include annular gussets 35 that provide structural support. Tube passages 33 are defined through the sleeves 32. The upstanding legs 36 are integrally connected to an engagement beam 38. A securing window 40 is defined between the connecting beam 34, the legs 36, and the engagement beam 38. A safety seat securing member (not shown in FIG. 5), such as a strap or belt, is configured to be positioned through the window 40. The safety seat securing member may be looped through the window 40 in order to secure a safety seat (not show in FIG. 5) to the seat restraint 30.

While the seat restraint 30 is shown having two sleeves 32, more or less sleeves 32 may be used. For example, the seat restraint 30 may include a single sleeve. Additionally, the restraint 30 may include a single tube, instead of spaced apart sleeves.

Spring tabs 42 extend from outer surfaces of the sleeves 32. Optionally, the spring tabs 42 may extend from inner surfaces of the sleeves 32. The spring tabs 42 are configured to be securely retained by reciprocal openings formed in an anchoring tube (not shown in FIG. 5). Alternatively, the sleeves 32 may include barbs, clasps, latches, protuberances, or the like that are configured to be retained by the reciprocal openings in the tube. Also, alternatively, the tube may include the tabs or other such protrusions, while the sleeves 32 include reciprocal openings.

Figure 6:
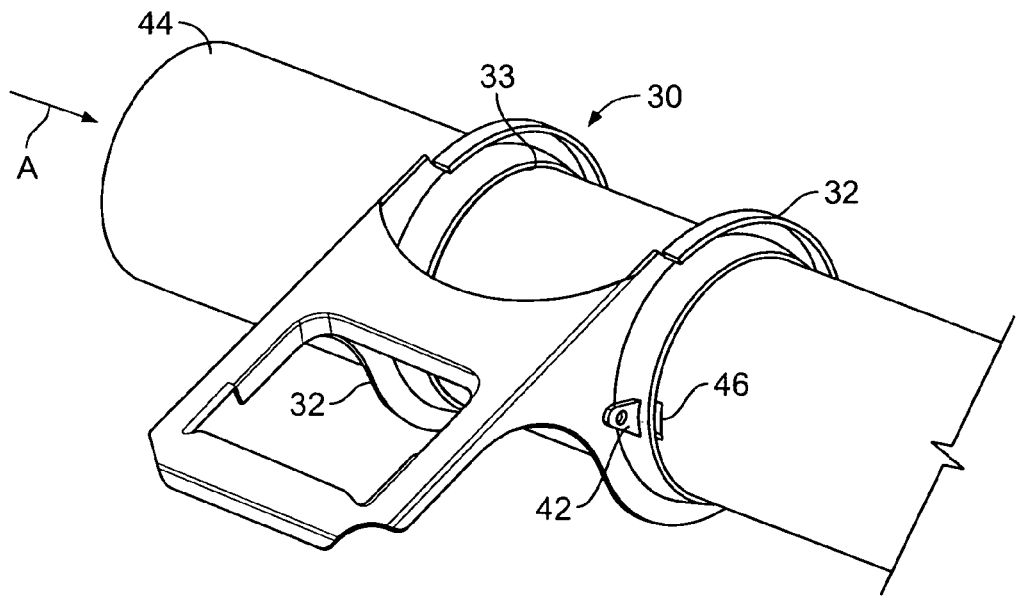
FIG. 6 illustrates an isometric view of a seat restraint secured to an anchoring tube according to an embodiment of the present invention.

FIG. 6 illustrates an isometric view of the seat restraint 30 secured to an anchoring tube 44 according to an embodiment of the present invention. In order to secure the seat restraint 30 to the anchoring tube 44, the tube passages 33 are aligned with the anchoring tube 44. The seat restraint 30 is then slid over the anchoring tube 44 in the direction of arrow A until the spring tabs 42 encounter reciprocal openings 46 formed through the anchoring tube 44. Once the spring tabs 42 encounter the reciprocal openings 46, the spring tabs 42 spring or snap into the openings 46, thereby securing the seat restraint 30 to the anchoring tube 44. As such, the seat restraint 30 does not slide or rotate relative to the anchoring tube 44.

Moreover, the cooperation between the spring tabs 42 and the reciprocal openings 46 ensures that the seat restraint 30 is properly positioned and centered. That is, the reciprocal openings 46 are formed at specific locations on the anchoring tube 44 to ensure that the seat restraint 30 secures to the anchoring tube 44 at the correct position. Also, as shown and described above, the seat restraint 30 may be secured to the anchoring tube 44 without welding, or additional fasteners and components.

Figure 7:
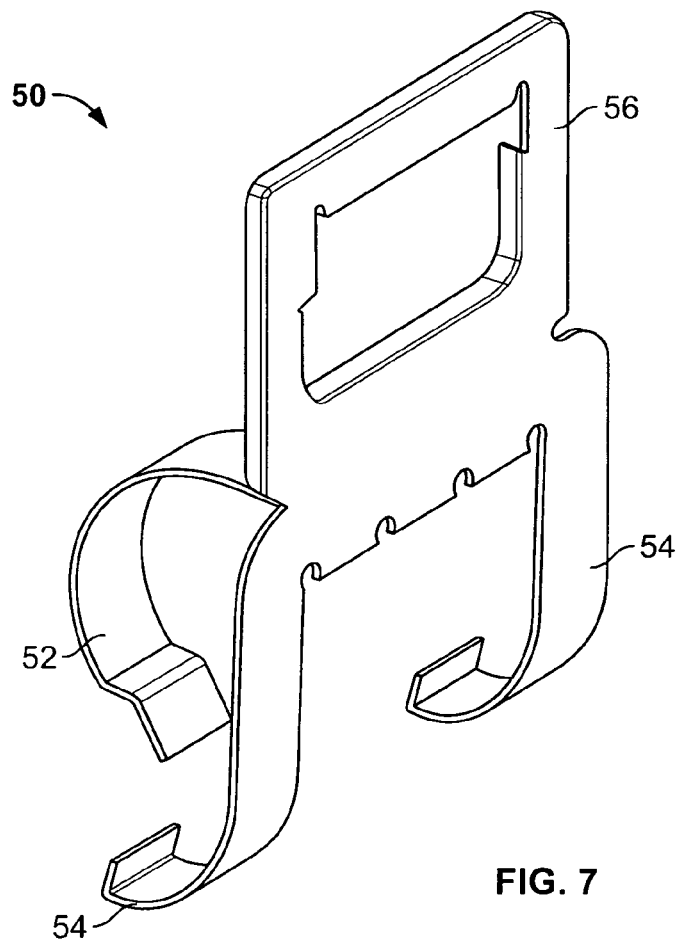
FIG. 7 illustrates an isometric view of a seat restraint according to an embodiment of the present invention.

FIG. 7 illustrates an isometric view of a seat restraint 50 according to an embodiment of the present invention. The seat restraint 50 includes a paw member 52 and spring members 54 integrally connected to a securing member 56. The seat restraint 50 may include more than one paw member 52, and more or less than the two spring members 54 shown. A strap or loop of a safety seat is secured to, through, or around the securing member 56, as discussed above.

As shown in FIG. 7, the spring members 54 may extend outwardly from the securing member 56 in a first direction, while the paw member 52 extends from the securing member 56 in a second direction. In order to position the seat restraint 50 on an anchoring tube, the paw member 52 is placed in a hole located on the anchoring tube. The seat restraint 50 is then rotated, thereby camming the spring members 54 into reciprocal holes formed in the anchoring tube. Thus, the seat restraint 50 may be secured to the anchoring tube without the use of welding or separate fasteners and components.

Thus, embodiments of the present invention provide an improved seat restraint system that is not secured to a fixed structure, such as a bent steel rod, through welds or separate fasteners. The embodiments of the seat restraint shown and described above may be quickly and easily secured to an anchoring tube or rod without an additional welding step, or fastening step. Instead, the embodiments of the seat restraint include integral fasteners that cooperate with structures on the anchoring tube or rod to securely fasten the seat restraint to the anchoring tube. Further, the cooperation of the integral fasteners on the seat restraint and the reciprocal structures of the anchoring tube ensure that the seat restraint is secured to the anchoring tube at a correct position.

The seat restraint may be formed of a single piece of sheet metal. However, the seat restraint and the anchoring tube may be formed of various other materials that are strong and resilient.

While various spatial terms, such as upper, lower, mid, lateral, horizontal, vertical, and the like may used to describe portions of the seat restraint, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A seat restraint configured to be secured to an anchoring tube comprising:
   at least one anchoring tube engaging member; and
   at least one fastening member integrally formed with said at least one anchoring tube engaging member, wherein said at least one fastening member is one of at least one spring tab configured to snapably engage a reciprocal opening formed in the achoring tube, an opening that securely retains a spring tab extending from said anchoring tube, and a paw member and at least one spring member.

2. The seat restraint of claim 1, wherein said at least one anchoring tube engaging member is a sleeve defining a tube passage, wherein said sleeve is configured to be positioned around at least a portion of an outer circumferential area of the anchoring tube.

3. The seat restraint of claim 1, wherein said at least one anchoring tube engaging member is a restraint tube configured to be positioned around at lest a portion of an outer circumferential area of the anchoring tube.

4. The seat restraint of claim 1, wherein said at least one anchoring tube engaging member comprises at least two anchoring tube engaging members.

5. The seat restraint of claim 1, wherein the seat restraint secures to the anchoring tube without welding.

6. A restraining system for a safety seat that is configured to be used in an automobile, the restraining system comprising:
   an anchoring tube;
   a seat restraint secured to said anchoring tube, said seat restraint comprising: (a) a safety seat securing member configured to securely retain a portion of the safaty seat; (b) at least one anchoring tube engaging member integrally connected to said safety seat securing member; and (c) at least one fastening member integrally formed with said at least one anchoring tube engaging member, wherein said at least one fastening member is one of at least one spring tab configured to snapably engage a reciprocal opening formed in said anchoring tube, an opening, and said anchoring tube comprises a spring tab configured to be securely retained within said opening, and a paw member and at least one spring member.

7. The restraining system of claim 6, wherein said at least one anchoring tube engaging member is a sleeve defining a tube passage, wherein said sleeve is configured to be positioned around at least a portion of an outer circumferential area of said anchoring tube.

8. The restraining system of claim 6, wherein said at least one anchoring tube engaging member is a restraint tube configured to be positioned around at least a portion of an outer circumferential area of said anchoring tube.

9. The restraining system of claim 6, wherein said at least one anchoring tube engaging member comprises at least two anchoring tube engaging members.

10. The restraining system of claim 6, wherein said seat restraint secures to said anchoring tube without welding.

11. A restraining system for a safety seat that is configured to be used in an automobile, the restraining system comprising:

an anchoring tube;

a seat restraint secured to said anchoring tube, wherein said seat restraint is secured to said anchoring tube without the use of welding or separate fasteners, and wherein said seat restraint comprises integrally formed fastening members that cooperate with reciprocal structures of said anchoring tube to secure said seat restraint to said anchoring tube, said fastening members being one of spring tabs, and a paw member and at least one spring member.

* * * * *